United States Patent [19]

Frommer et al.

[11] 3,887,434
[45] June 3, 1975

[54] MICROBIOLOGICAL PRODUCTION OF INVERTASE

[75] Inventors: Werner Frommer; Erich Rauenbusch, both of Wuppertal, Germany

[73] Assignee: Bayer Aktiengesellschaft, Leverkusen, Germany

[22] Filed: May 24, 1973

[21] Appl. No.: 363,640

[30] Foreign Application Priority Data
June 9, 1972   Germany............................ 2228112

[52] U.S. Cl. ................................................ 195/65
[51] Int. Cl............................................ C12d 13/10

[58] Field of Search........................ 195/62, 65, 66 R

[56] References Cited
FOREIGN PATENTS OR APPLICATIONS
1,264,374   3/1968   Germany

*Primary Examiner*—Lionel M. Shapiro
*Attorney, Agent, or Firm*—Depaoli & O'Brien

[57] ABSTRACT

The disclosure relates to a novel process for the microbiological production of the enzyme invertase by culturing yeast strains of the variety *Saccharmyces carlsbergensis* Hansen under aerobic conditions in an aqueous nutrient medium.

10 Claims, No Drawings

MICROBIOLOGICAL PRODUCTION OF INVERTASE

BACKGROUND OF THE INVENTION

The enzyme invertase is employed commercially inter alia in the preparation of invert sugar, artificial honey and marzipan and in the chocolate industry for the production of non-crystallizable creams.

Heretofore, according to customary practices the enzyme invertase has been produced by culturing yeast strains, especially of the variety *Saccharomyces carlsbergensis* Hansen. Good yields are obtained if the culture is carried out in a nutrient medium customary in the art, that is, those containing sucrose, D-glucose or D-fructose, with addition of sorbitol and/or D-xylose as illustrated, for example, by German Patentschrift No. 1,264,374.

THE INVENTION

In accordance with the invention there is provided a process for the microbiological production of invertase which comprises culturing *Saccharomyces carlsbergensis* Hansen strain CBS 268.72, 269.72 or 270.72 under aerobic conditions in an aqueous nutrient medium which strains are mutants of the strain *Saccharomyces carlsbergensis* Hansen lv,15, referred to German Patentschrift No. 1,264,374.

According to the process of the invention any nutrient medium capable of sustaining the growth of yeasts of the species *Saccharomyces carlsbergensis* Hansen with the production of invertase can be used and many media having this capability are known in the art such as, for example, the media disclosed in German Patentschrift 1,264,374.

In general, however, it is necessary to include cane sugar or molasses (i.e., sucrose), maltose, D-fructose or D-glucose in the aqueous medium as a carbon source. In this respect it is preferred to the medium as described in German Patentschrift No. 1,264,374 containing as carbon sources sucrose, D-glucose or D-fructose and sorbitol or D(+)-xylose or a mixture thereof. The sorbitol is preferably present in an amount of 4–8 percent by weight of the medium, and the D(+)-xylose in an amount of 0.5 to 1.5 wt percent of the medium. Good yields of invertase are obtained with only 0.2wt percent of sucrose. If D(+)-glucose or D(−)-fructose are enployed instead of sucrose, the nutrient medium should contain both sorbitol and D(+)-xylose. For further details of the nutrient medium preferred for use in the present invention are disclosed in German Patentschrift No. 1,264,374. Best results are generally obtained by culturing the yeast at about 25°C but yields of invertase can be obtained both above and below this temperature.

After the optimal concentration of invertase in the culture has been reached the culture is worked up for invertase. The yeast cells are separated from the culture broth by centrifugation. The enzyme may either be extracted from the yeast cells by autolysis (for example, as described by Underkofler and Hikey in "Industrial Fermentations," [Pub. by Chemical Publishing Co., Inc., New York, 1954] Vol. 2, page 148) or by any other method of cell disruption as ultra sound or high pressure homogenizers. The supernatant of the culture broth contains also a small amount of enzyme which may be recovered by suitable methods; but in most cases it can be neglected.

While on the one hand haploid yeast cells are necessary in order to have genetically defined conditions for a mutant selection program, these haploid cells on the other hand prove unsuitable for numerous biological productions. For this reason, practically all culture yeasts are polyploid, and in most cases even aneuploid. The conversion of haploid into aneuploid cells and of aneuploid into haploid cells is only possible with great difficulty or not at all. [See Emeis, CC., "Monatsschrift fur Brauerei" 19, 1–22 (1966)] Surprisingly, success has been achieved in obtaining from the culture strain *Saccharomyces carlsbergensis* Hansen lv 15 described in German Patentschrift No. 1,264,374, by mutation and genetic selection, industrially usable mutants for the production of invertase, which are capable of producing substantially better yields of invertase, under otherwise identical conditions, than the parent strain. The microbiological process according to the invention, using the abovementioned yeast strains CBS 268.72, CBS 269.72 and CBS 270.72 represents a substantial improvement over processes heretofore known in the art.

A method of determination for characterising yeast strains of the *Saccharomyces carlsbergensis* Hansen variety is disclosed in I. Lodder, N.I.W. Kreger-van Rij: "The Yeasts" [North Holland Publishing Company, Amsterdam 1952]. All three strains employed in accordance with the invention do not differ significantly from the definition of this variety.

The production and isolation of the mutants employed in the process of the invention, *Saccharomyces carlsbergensis* Hansen CBS 268.72, 269.72 and CBS 270.72 was carried out as follows:

Production and Isolation of the Mutants

A well-grown slope culture tube which contains yeast cells of the strain *Saccharomyces carlsbergensis* lv 15 referred to in German Patentschrift 1,264,374 is rinsed with 10 ml of $H_2O$ under sterile conditions and a 1 litre Erlenmeyer shaking flask containing 100 ml of 5 percent strength Maltzin (Diamalt AG, Munchen) nutrient solution is inoculated with 0.5ml of this cell suspension. After 40 hours incubation at 25°C on a rotary shaker, the cells are twice washed with 1 percent strength NaCl solution. The cell concentration is then determined in a counting chamber and adjusted to $10^7$ ml with 1 percent strength NaCl solution. This inoculation material can be kept for several days at +2° – 5°C.

For the mutagen treatment, irradiation of a 5 ml sample of this cell suspension with a UV lamp from a distance of 50 cm while stirring the suspension with magnetic stirrers in quartz Petri dishes.

The isolation of the mutants was carried out in two stages in order to deal with hetergeneous mutant colonies as follows: 1) The irradiated suspension is first diluted with $H_2O$ and, in the last stage, with 1% strength agar solution at 45°C. 4 ml portions of the agar-cell suspension are poured out onto a nutrient agar plate which contains 25 ml of nutrient agar. 2) Each of the colonies produced is smeared onto a second agar plate. Two individual colonies from each smear are isolated in Diamalt sloping culture tubes.

TESTING THE ISOLATED COLONIES

The isolated colonies were tested in standard fermentations on rotary shaking machines (6 cm turning radius, 290 revolutions/minute). Inoculation was carried out of 200 ml Erlenmeyer flasks containing 25 ml of 5 percent strength Maltzin nutrient solution with 0.2 ml of the cell suspensions obtained from the isolation tubes and incubated the system for 42–48 hours at 25°C.

Subsequently, there was introduced 1 ml of inoculation material from each of these pre-cultures into the main culture with the nutrient solution (25 ml in 200 ml Erlenmeyer flasks).

| | |
|---|---|
| Sucrose | 2% by weight |
| Sorbitol | 8% by weight |
| Xylose Syrup | 3% by weight |
| Corn steep liquor | 1.5% by weight |
| Bayer E 100 (anti-foaming agent) | 0.1% by volume |
| $(NH_4)_2SO_4$ | 1% by weight |
| $KH_2PO_4$ | 1% by weight |
| $CaCO_3$ | 1% by weight |
| $MgSO_4$ | 0.01% by weight |
| Concentrated $H_2SO_4$ | 0.19% by volume |

The pH-value was about 4.8 before sterilization and about 5.4 after sterilization, which was carried out for 60 minutes at 112° and one minute 121°.

Incubation of these cultures on rotary shaking machines was carried out for 88–96 hours at 25°C and then determined the invertase contents of the yeast cells according to methods which are in themselves known (for example by spectrophotometric determination).

MUTANT SELECTION

It was found, by using the method of determination of invertase that after mutation had been carried out as described above, of the 129 mutated strains obtained from the strain *Saccharomyces carlsbergensis* Hansen Iv 15 there were three strains which produced distinctly more invertase than the starting strain Iv 15.

The best producer of invertase, which was called *Saccharomyces carlsbergensis* Hansen Iv 15A, was subjected to a renewed mutagen treatment with subsequent selection and there was obtained amongst 107 strains tested, two showing distinctly improved invertase production. The better of these two, the strain *Saccharomyces carlsbergensis* Hansen Iv 15/B was subjected to the same procedure and amongst 160 isolated colonies tested there was obtained one yeast strain showing distinctly improved yield, which was called strain Iv 15/C.

The three abovementioned strains were deposited at the Centralbureau voor Schimmelcultures in Baarn (Netherlands). under the following accession numbers:

| | |
|---|---|
| *Saccharomyces carlsbergensis* Hansen Iv 15/A | : CBS 268.72 |
| *Saccharomyces carlsbergensis* Hansen Iv 15/B | : CBS 269.72 |
| *Saccharomyces carlsbergensis* Hansen Iv 15/C | : CBS 270.72 |

Under comparable test conditions, strain Iv 15 gave 30 units, Iv 15/A 50 units, Iv 15/B 55 units and Iv 15/C 58 units, according to Weidenhagen, per 100 ml of culture solution.

The specific activity of the enzyme is in general quoted according to Weidenhagen ("Erg. Enzymforschung," 1, page 201, Akad Verl. Leipzig, 1932).

The following examples will serve illustrate the process of the invention for the production of invertase.

EXAMPLE 1

A 200 ml Erlenmeyer flask contains 25 ml of nutrient solution of the composition indicated under B) above.

The pH-value of the contents of the flask was about 4.8 before sterilization. This flask is sterilised for 60 minutes at 112°C and one minute at 121°C and is inoculated with 1 ml of a cell suspension of *Saccharomyces carlsbergensis* Hansen CBS 268.72 which has been grown on Maltzin nutrient solution. The cell suspension employed is obtained on rinsing a well-grown sloping culture tube of Maltzin agar (5 percent Maltzin, 2 percent agar) with 10 ml of water. The culture is incubated for 90 hours on a rotary shaking machine at 25°C. After 90 hours growth, the yeast cells are first separated from the mass of the nutrient solution by centrifuging and then further water is removed from the residual yeast cake by pressing out on suction filters. A moist yeast with a solids content of about 30 percent is thus obtained.

The yield of invertase was determined in the original culture medium before removal of the cells. 50 invertase units, according to Weidenhagen [loc. cit.], were found per 100 ml of fermentation broth.

EXAMPLE 2

The procedure indicated in Example 1 was followed, except that, 1 ml of a cell suspension of *Saccharomyces carlsbergensis* Hansen CBS 269.72 was employed for inoculation.

Yield: 55 invertase units, according to Weidenhagen [loc. cit.], per 100 ml of fermentation broth.

EXAMPLE 3

The procedure indicated in Example 1 was followed, except that 1 ml of a cell suspension of *Saccharomyces carlsbergensis* Hansen CBS 270.72 was employed for inoculation.

Yield: 58 invertase units according to Weidenhagen [loc. cit.], per 100 ml of fermentation broth.

EXAMPLE 4

For comparison, 1 ml of a cell suspension of *Saccharomyces carlsbergensis* Hansen Iv 15 of German Patent Specification DBP, 1,264,374 was used for inoculation in the process described in Example 1.

Yield: 30 invertase units, according to Weidenhagen [loc. cit.], per 100 ml of fermentation broth.

While the invention has been described in detail above, it is apparent that it is capable for numerous modifications and embodiments without departing from the essential spirit and character thereof. Thus, the scope of the invention is not intended to be limited by the specific disclosure above but only as defined by the subjoined claims.

What is claimed is:

1. A process for the microbiological production of invertase which comprises culturing a strain of the microorganism *Saccharomyces carlsbergensis* Hansen CBS 268.72, 269.72 and 270.72 under aerobic conditions in an aqueous nutrient medium.

2. The process of claim 1 wherein the strain of microorganism is *Saccharomyces carlsbergensis* Hansen CBS 268.72.

3. The process of claim 1 wherein the strain of microorganism is *Saccharomyces carlsbergensis* Hansen CBS 269.72.

4. The process of claim 1 wherein the strain of microorganism is *Saccharomyces carlsbergensis* Hansen CBS 270.72.

5. The process of claim 1 wherein the aqueous nutrient medium contains source of carbon.

6. The process of claim 5 wherein the source of carbon is a member of the group consisting of sucrose, D-glucose, D-fructose, sorbitol and D-xylose.

7. The process of claim 5 wherein the source of carbon is sucrose.

8. The process of claim 5 wherein the source of carbon is D-glucose.

9. The process of claim 5 wherein the source of carbon is D-fructose.

10. The process of claim 5 wherein the source of carbon is sorbitol.

* * * * *